(No Model.)
J. G. RODGERS.
RUBBER TIRE.
No. 599,733. Patented Mar. 1, 1898.
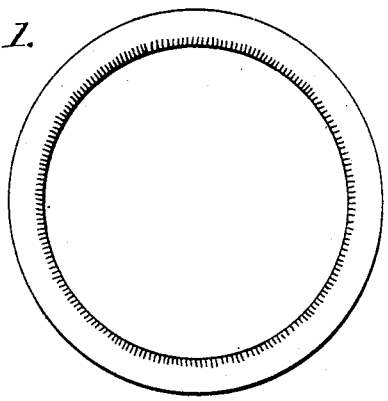
Fig. 1.
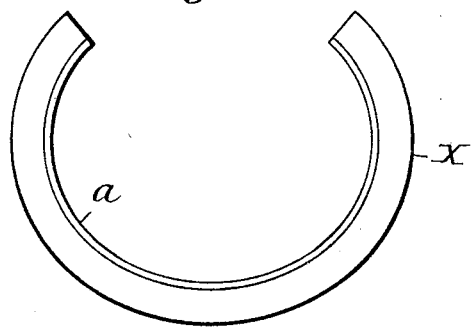
Fig. 2.
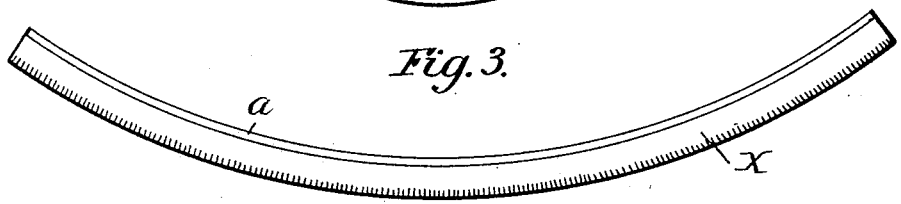
Fig. 3.
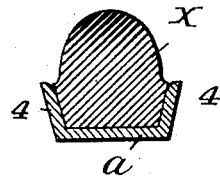 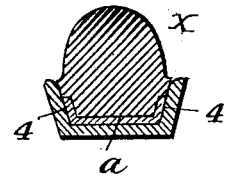 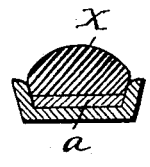 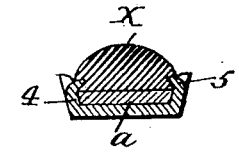
Fig. 4.  Fig. 5.  Fig. 6.  Fig. 7.
Witnesses
J. G. Hinkel
James W. Stevens
Inventor
James G. Rodgers
by Josiah Freeman
Attorneys

UNITED STATES PATENT OFFICE.

JAMES GODMAN RODGERS, OF SPRINGFIELD, OHIO.

RUBBER TIRE.

SPECIFICATION forming part of Letters Patent No. 599,733, dated March 1, 1898.

Application filed February 3, 1897. Serial No. 621,883. (No model.)

*To all whom it may concern:*

Be it known that I, JAMES GODMAN RODGERS, a citizen of the United States, residing at Springfield, Clark county, Ohio, have invented certain new and useful Improvements in Rubber Tires, of which the following is a specification.

My invention relates to certain new and useful improvements in the manufacture of rubber tires for wheels, especially adapted to general vehicle use; and it has for its object to improve the construction of such tires and the method of attaching them to the wheels, as well as to improve the method of manufacturing the tires; and to these ends my invention consists in the improvements in the tire and in the method of manufacturing the same, substantially as hereinafter more particularly set forth.

Referring to the accompanying drawings, wherein I have illustrated sufficient to disclose the object and nature of my invention, Figure 1 is a diagram showing the condition of the tire as ordinarily made. Figs. 2 and 3 are diagrams indicating the method of vulcanizing and bending the tire. Figs. 4 to 7 are vertical sections of different forms of tires embodying my invention.

In the usual manufacture of rubber tires for wheels and of rubber-tired wheels it is common to bend a strip of vulcanized rubber to fit the periphery of the wheels or to form a continuous tire from a strip which is bent to a circle and the ends connected. As a result the rubber of the tire is compressed at the inside, as indicated by the shaded lines, diagram Fig. 1, and the outer portion or periphery is relatively in a distended condition. I have discovered that this is the reverse of the conditions which should prevail, that the rubber should be in a more condensed or compressed or consolidated condition at the periphery, and that when the periphery is so consolidated the tire is not only much more durable, but is much better fitted to overcome the shocks and jars in the course of use than tires having the periphery relatively distended. In order to secure this result, I have devised a new method of manufacture, consisting in forming a tire-section of rubber composition upon a circle or part of a circle smaller in circumference and diameter than the periphery of the wheel to which the tire is to be applied, vulcanizing the composition in this shape, providing means for preventing the longitudinal extension of the tire at the inner part, and then applying the tire to the periphery or rim of the wheel. Thus I bend a strip or band *a*, preferably of metal, to a circle smaller than that of the periphery of the wheel, apply the rubber composition X thereto, molding it thereon, if necessary, the said composition of course being of uniform density, and then vulcanize the composition, after which the strip is bent to a wider curve, corresponding to that of the periphery of the wheel, as shown in Fig. 3. It will be evident that in thus bending the vulcanized strip to a larger curve that portion at the periphery (indicated by the shaded lines, Fig. 3) is compressed or condensed, and that therefore the tire consisting of one or more sections of the character described is a tire the periphery of which is in a more solid or condensed condition than the inner portion.

The body of rubber composition may be applied directly to the strip *a*, so as to be secured thereto in the process of vulcanizing, or it may be molded and secured in any other suitable manner, provided that the composition is vulcanized when upon a curve of less diameter than that of the periphery of the wheel, or it may be molded and vulcanized upon such a curve in a mold with a strip of fabric or with longitudinal wires at the inner part and thereafter secured to or in the rim.

The strip *a* may be of any suitable cross-sectional shape. As shown in Fig. 4, it constitutes the rim or part of the rim of a wheel, and has diverging side flanges 4 4, receiving the base of the tire, molded upon a smaller curve and then applied to the groove in the rim or vulcanized to the rim, which is first curved to coincide with one circle and then expanded after vulcanization, as before described.

In some cases the strip *a* may be flanged and the composition may be vulcanized thereto, and the strip and tire may then be applied in the groove of the rim, as shown in Figs. 5 and 6, the strip in Fig. 5 having flanges. Where the tire is vulcanized or secured to the strip *a* and the latter is fitted within a groove of the rim, the tire may be securely held in place by bending in the sides or flanges 4, forming at intervals lips 5, Figs. 5 and 7, which holds the tire in place within the rim preferably by bearing upon the upper edges of the strip a.

I do not limit myself to any special form of rubber tire, but prefer to make it solid, or substantially solid, and contracted laterally beyond the edges of the flanges 4 4, so that pressure upon the tire radially will not distend it over said flanges.

Without limiting myself to the precise construction and mode of operation described, I claim as my invention—

1. In the manufacture of rubber tires, applying rubber compositions to a solid, non-pliable, flexible strip curved to coincide with a circle less in diameter than that of the wheel to which the tire is to be applied, vulcanizing the composition upon the strip to secure the two immovably together, and then bending said strip to a wider curve to compress the tire at the periphery, substantially as described.

2. In the manufacture of rubber-tired wheels, first vulcanizing the rubber composition upon a solid, non-pliable, flexible strip curved to coincide with a circle of less diameter than that of the wheel to which the tire is to be applied and then applying the strip to said rim, substantially as described.

3. A wheel having a rim and a tire consisting of a band of rubber secured to an inner flexible metallic band or strip and having its periphery in a more compressed and condensed condition than the inner portion, substantially as described.

4. A wheel having a rim provided with a peripheral groove and with outwardly-flaring side flanges, a flexible non-extensible strip, a rubber tire vulcanized to said strip, said tire and strip being within the groove of the rim and the tire being laterally contracted beyond the edges of the side flanges of the rim and having its periphery in a more compressed and condensed condition than the inner portion, substantially as described.

5. A wheel having a rim provided with a peripheral groove and with side flanges, a flexible non-extensible strip within the peripheral groove, said strip being likewise provided with a groove and with side flanges and a rubber tire vulcanized within the groove of the strip, substantially as described.

6. A wheel having a channeled rim and a tire fitted in said channel consisting of a solid band of rubber and a non-extensible flexible strip to which the band of rubber is vulcanized, the said strip constituting the sole support for the base of the rubber, and said rubber having its periphery in a more compressed condition than the inner portion, substantially as described.

7. A wheel having a rim provided with a peripheral groove and with outwardly-flaring side flanges, a flexible non-extensible metallic band within the groove of the rim, a rubber tire immovably connected to the metallic band and separated lips extending inwardly from the side flanges and bearing upon the edges of the metallic band, substantially as described.

8. A wheel provided with a rim and a flexible non-extensible strip, each being provided with a peripheral groove and with outwardly-flaring side flanges, and the strip being secured within the groove of the rim, and a rubber tire vulcanized within the groove of the strip, said tire being laterally contracted beyond the edges of the side flanges of the rim, substantially as described.

In testimony whereof I have signed my name to this specification in the presence of two subscribing witnesses.

JAMES GODMAN RODGERS.

Witnesses:
F. L. FREEMAN,
J. A. FAIRGRIEVE.